United States Patent
Doi

(10) Patent No.: US 6,744,156 B2
(45) Date of Patent: Jun. 1, 2004

(54) STEPPING MOTOR HAVING A PREDETERMINED NUMBER OF TEETH CORRESPONDING TO MAGNETICALLY STABLE POINTS PER ROTOR ROTATION

(75) Inventor: Hirofumi Doi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 133 days.

(21) Appl. No.: 09/963,418

(22) Filed: Sep. 27, 2001

(65) Prior Publication Data

US 2002/0113501 A1 Aug. 22, 2002

(30) Foreign Application Priority Data

Feb. 22, 2001 (JP) ........................................ 2001-047200

(51) Int. Cl.[7] ............................................. H02K 37/00
(52) U.S. Cl. ..................... 310/49 R; 310/46; 310/40 R; 310/10
(58) Field of Search .................. 310/48 R, 46, 310/40 R, 10

(56) References Cited

U.S. PATENT DOCUMENTS

| | | | | |
|---|---|---|---|---|
| 3,558,941 A | * | 1/1971 | Brebbia et al. ............ | 310/49 R |
| 3,671,841 A | * | 6/1972 | Hoffmann ................... | 318/696 |
| 3,909,646 A | * | 9/1975 | Haydon ....................... | 310/83 |
| 4,004,168 A | * | 1/1977 | Haydon ....................... | 310/41 |
| 4,087,709 A | * | 5/1978 | Haydon ....................... | 310/83 |
| 4,717,898 A | * | 1/1988 | Cappelli ..................... | 333/137 |
| 4,794,292 A | * | 12/1988 | Torisawa .................... | 310/257 |
| 5,043,613 A | * | 8/1991 | Kurata et al. .............. | 310/49 R |
| 5,532,531 A | * | 7/1996 | Sakamoto ................... | 310/49 R |
| 5,598,046 A | * | 1/1997 | Miyazawa et al. ......... | 310/49 R |
| 5,734,210 A | * | 3/1998 | Keutz ......................... | 310/49 R |
| 5,845,390 A | * | 12/1998 | Cheng et al. ............... | 29/596 |
| 6,028,377 A | * | 2/2000 | Sakamoto ................... | 310/49 R |
| 6,198,182 B1 | * | 3/2001 | Bustamante et al. ...... | 310/49 R |
| 6,509,661 B1 | * | 1/2003 | Kujira et al. ............... | 310/89 |
| 6,674,187 B2 | * | 1/2004 | Isozaki et al. ............. | 310/49 R |

FOREIGN PATENT DOCUMENTS

| | | | |
|---|---|---|---|
| DE | 41 33 260 A1 | 4/1992 | |
| JP | 58-63063 A | 4/1983 | |
| JP | 62-268676 | 11/1987 | ............ B41J/11/00 |
| JP | 63-206972 A | 8/1988 | |
| JP | 2-276453 | 11/1990 | .......... H02K/37/24 |
| JP | 10-265089 A | 10/1998 | |

OTHER PUBLICATIONS

Ishikawa, Takakushagi and Matsunami: "Transactions on Magnetics", vol. 36, No. 4, Jul. 2000, p. 1854–1857.

* cited by examiner

Primary Examiner—Burton S. Mullins
Assistant Examiner—Pedro J. Cuevas
(74) Attorney, Agent, or Firm—Sughrue Mion, PLLC

(57) ABSTRACT

There is disclosed a stepping motor capable of increasing assembling work efficiency when the tooth of the gear to be driven provided to a driven member is connected to the tooth of the output shaft gear of the rotor of the stepping motor. The number of teeth for an output shaft gear is set to a predetermined ratio with respect to the number of magnetically stable points per rotation of the rotor, such that the gear to be driven can be held by a reference position stopper when a coil is electrified by a regulated electrification pattern. Thus, while the coil is electrified by the regulated electrification pattern, and the gear to be driven is held by the reference position stopper, the tooth respectively of the gear to be driven, and the output shaft gear are connected to each other. Therefore, these teeth are engaged with each other in a normal position with respect to a reference position.

6 Claims, 10 Drawing Sheets

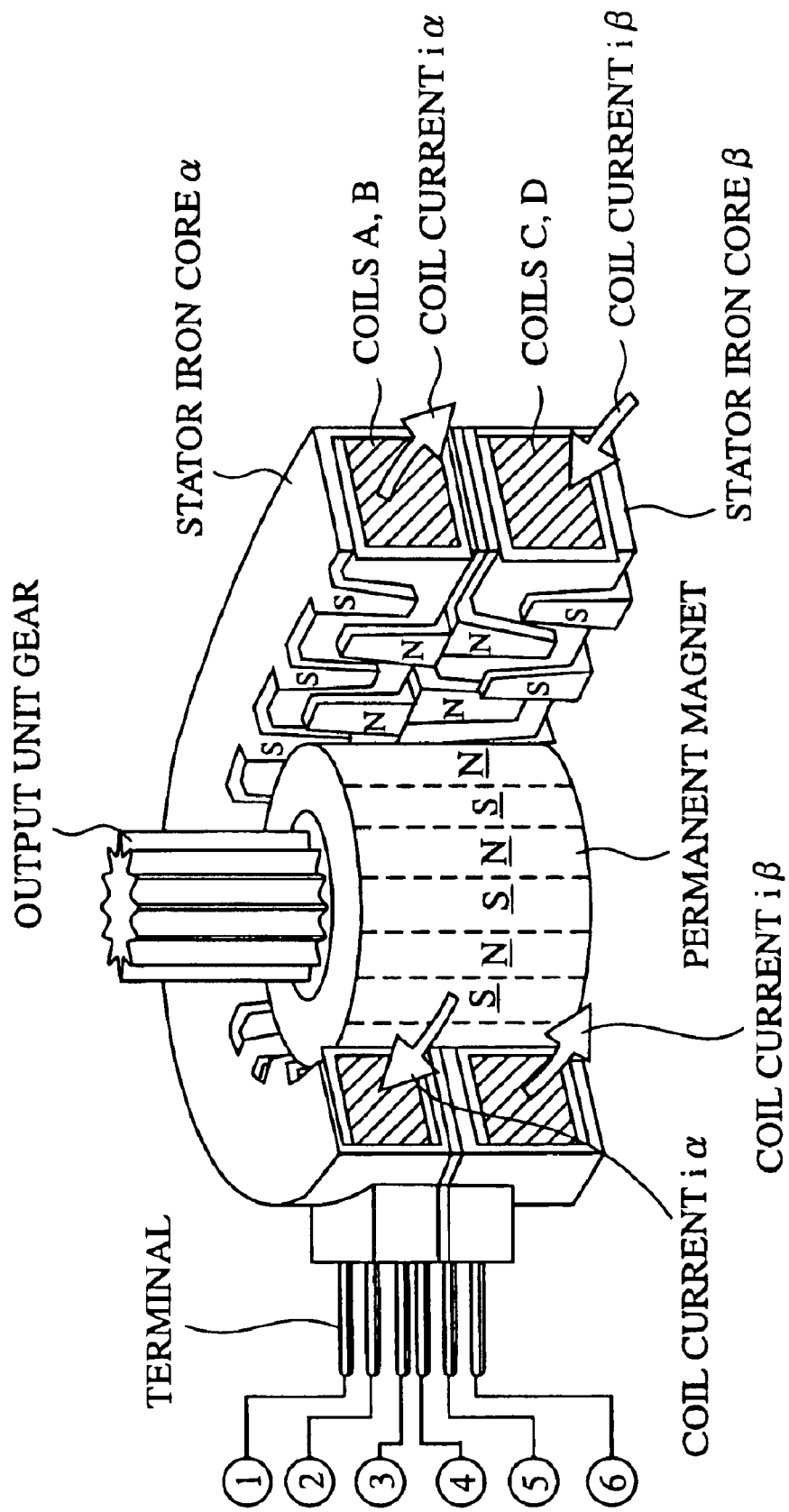

ELECTRIFICATION

STEPPING MOTOR HAVING A PREDETERMINED NUMBER OF TEETH CORRESPONDING TO MAGNETICALLY STABLE POINTS PER ROTOR ROTATION

BACKGROUND OF THE INVENTION

1. Field of the Invention

This invention relates to an on-vehicle stepping motor.

2. Description of the Related Art

A stepping motor has hitherto been used for driving an on-vehicle actuator. This stepping motor is adapted to drive a member to be driven based on a signal sent according to the running state of an engine, in such a way as to set the member in a target position. As a method for transmitting a driving force for such a purpose, there has been a widely used method in which an output shaft gear formed on the rotor of the stepping motor is first driven to rotate, and thereafter the thus generated rotation is transmitted to a gear to be driven, which is attached to the member to be driven.

However, if there are no means provided for directly detecting the rotor position of the stepping motor, or the position of the member to be driven by the rotation of the rotor, the operation of initialization must be carried out. Specifically, in order to correct a difference between the position of the member to be driven at the time of a previous engine stop and a reference position at the time of engine starting, for each starting of the engine, the member to be driven is set in the reference position by rotating the stepping motor in one direction and abutting the rotor or the member to be driven to a stopper.

Thus, there has been developed a stepping motor having a mechanism for pressing the member to be driven to the reference position side by an elastic body, or pressing the rotor of the stepping motor to the elastic body, and returning the member to be driven back to the reference position by the pressing force of the elastic body when the electrification of the stepping motor is stopped after the engine stop.

For such a stepping motor, an electrification pattern of the coil of the stepping motor in the reference position is regulated, and the member to be driven must be held in the reference position when the electrification pattern is activated. Consequently, there must be coincidence between the reference position of the member to be driven, and the position of the rotor holding a permanent magnet held in a magnetically stable state at the regulated electrification pattern.

Therefore, the position of a tooth of the gear to be driven, attached to the member to be driven, is inevitably decided at the reference position, and the stepping motor must be assembled such that the position of a tooth of the output shaft gear formed in the output shaft of the stepping motor can agree with the tooth of the gear to be driven in the reference position.

Because of the foregoing constitution of the conventional stepping motor, it is necessary to carry out assembling work and provide devices described below, in order to assemble the stepping motor while the tooth of the gear to be driven, attached to the member to be driven in the reference position, and the tooth of the output shaft gear of the rotor held in the magnetically stable state at the regulated electrification pattern of the stepping motor, are engaged with each other.

First, the member to be driven is fixed in the reference position. Then, by electrifying the stepping motor based on the electrification pattern in the reference position, the permanent magnet is held in a magnetically stable state, and thereby the rotor for holding the permanent magnet is fixed. In this case, the position of the tooth of the output shaft gear when the rotor is held in the magnetically stable state must be verified. In addition, work must be carried out to engage the tooth of the output shaft of the rotor with the tooth of the gear to be driven of the member to be driven.

Thus, devices for holding the member to be driven in the reference position and electrifying the stepping motor must be provided.

The necessities of complex work and various devices have caused a reduction in assembling work efficiency.

The present invention was made to solve the foregoing problems, and it is an object of the invention to provide a stepping motor capable of increasing assembling work efficiency when the tooth of the gear to be driven of the member to be driven, is to be connected to the tooth of the output shaft gear of the rotor of the stepping motor.

SUMMARY OF THE INVENTION

In accordance with the present invention, there is provided a stepping motor, comprising: a plurality of coils for switching a direction of magnetism generated by switching electrification; a stator including a plurality of stator iron cores, for forming a magnetic pole by integrating magnetism generated by each of the coils; a rotor adapted to hold a permanent magnet, and rotated by attraction/repulsion between the permanent magnet and a magnetic pole of each of the stator iron cores; a housing provided to integrally cover the stator and the rotor; and an output shaft gear formed in an output shaft of the rotor, and connected to a gear to be driven, of a member to be driven. In this case, the number of teeth for the output shaft gear is set to a predetermined ratio with respect to the number of magnetically stable points per rotation of the rotor, in order to hold the member to be driven in a reference position when the coil is electrified by a regulated electrification pattern.

According to the stepping motor of the present invention, the number of magnetically stable points per rotation by one electrification pattern is obtained by the following equation: (number of magnetically stable points per rotation by one electrification pattern)=(total number of claws of stator iron core)÷(2 poles, N and S, of stator iron core)÷(2 phases, upper and lower, of stator iron core), wherein, the 2 poles, N and S, of the stator iron core are fixed values of 2.

According to the stepping motor of the invention, the number of teeth for the output shaft gear is set equal to the number of magnetically stable points per rotation of the rotor.

According to the stepping motor of the invention, the output shaft of the rotor and the output shaft gear are formed to be integral.

According to the stepping motor of the invention, the output shaft gear is made of a resin material.

According to the stepping motor of the invention, the output shaft gear is made of a metallic material.

BRIEF DESCRIPTION OF THE DRAWINGS

FIG. 4 is a partial sectional view showing internal components of the stepping motor of the embodiment.

DETAILED DESCRIPTION OF THE PREFERRED EMBODIENT

Next, the preferred embodiment of the invention will NOW be described.

(Embodiment)

Figure 1:
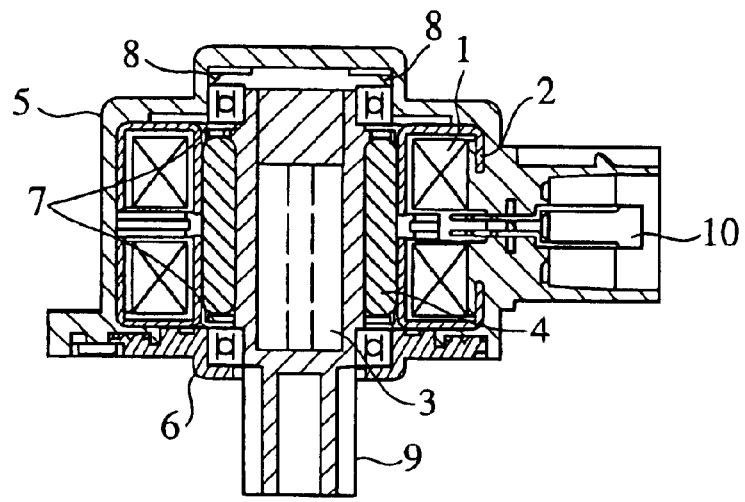
FIG. 1 is a sectional view schematically showing a structure of a stepping motor according to an embodiment of the present invention.
Figure 2A:
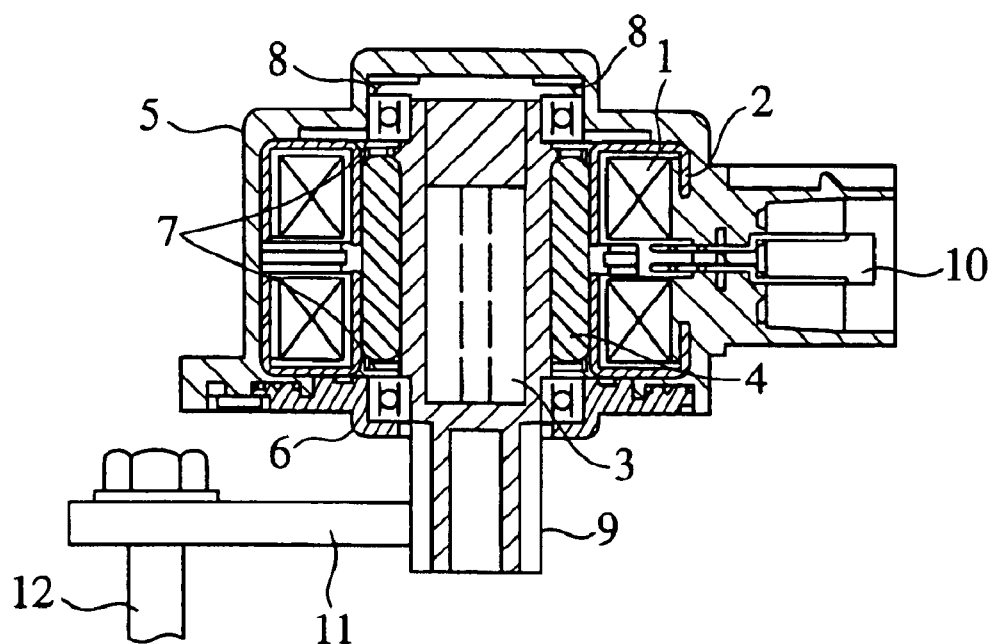
FIGS. 2A and 2B are explanatory views, each illustrating a situation when the transmission of rotation by a gear and positioning of a member to be driven are executed by use of the stepping motor of the embodiment.
Figure 2B:
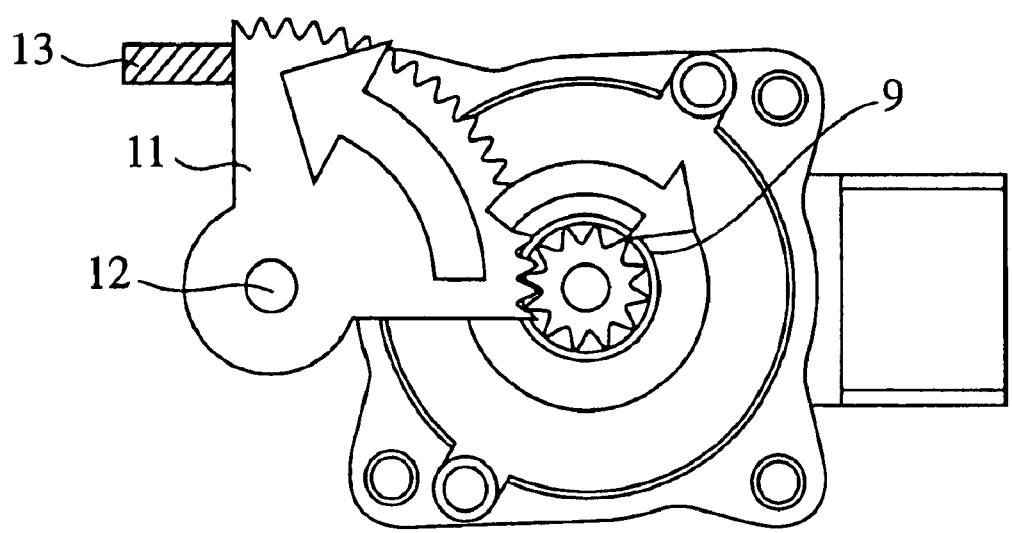

FIG. 1 is a sectional view schematically showing the structure of a stepping motor according to an embodiment of the invention; and FIGS. 2A and 2B are explanatory views, each illustrating a situation when the transmission of rotation by a gear and the positioning of a member to be driven are executed by use of the stepping motor of the embodiment. In the drawings, a reference numeral 1 denotes a coil for generating magnetism by electrifying the stepping motor; and 2 a stator iron core formed to envelope the coil 1 and adapted to form a magnetic pole by integrating magnetism generated by the coil 1. The coil 1 and the stator iron core 2 constitute a stator.

A reference numeral 3 denotes the output shaft of a rotor; and 4 a permanent magnet provided in the output shaft 3 in such a manner as to face the magnetic pole formed by the stator iron core 2. The output shaft 3 and the permanent magnet 4 constitute the rotor.

A reference numeral 5 denotes a housing provided to integrally cover the stator and the rotor, and adapted to form the outer portion of the stepping motor; 6 a boss fixed to the housing 5 to form the outer portion of the stepping motor; 7 a bearing provided to hold the rotational motion of the rotor, and fixed to the rotor in a thrust direction; and 8 an elastic body provided between the housing 5 and the bearing 7 to press the rotor holding the bearing 7 in the trust direction via the bearing 7.

A reference numeral 9 denotes an output shaft gear made of a resin material, integrally formed in the output shaft 3 of the rotor, and connected to a gear to be driven of a later-described member to be driven; and 10 a terminal for electrifying the coil 1.

A reference numeral 11 denotes a gear to be driven, connected to the output shaft gear 9 to be regulated for its position, and rotated associatively with the output shaft gear 9; 12 a member to be driven (hereinafter may be referred to just as a driven member), provided to hold the gear to be driven 11 (hereinafter may be referred to just as a driven gear), and rotated associatively with the driven gear 11; and 13 a reference position stopper provided to regulate the reference position of the driven member 12, and abutted to the driven gear 11 in the reference position.

Figure 3:
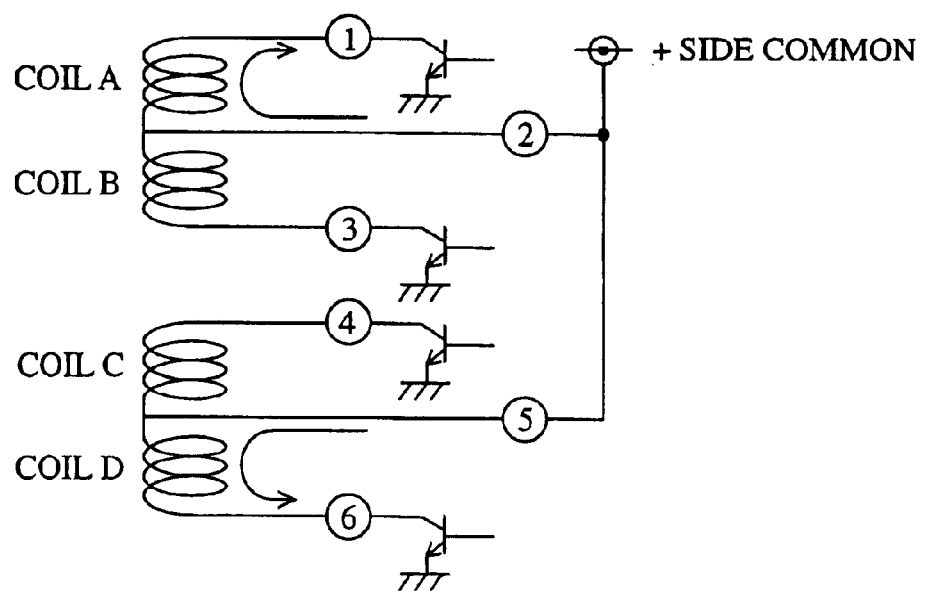
FIG. 3 is a connection view showing a driving circuit of the stepping motor of the embodiment.

FIG. 3 is a connection view showing the driving circuit of the stepping motor of the embodiment of the invention. In the drawing, numerals (1) to (6) denote the numbers of terminals 10. FIG. 3 specifically shows a state where (2)→(1) and (5)→(6) of the terminals 10 are electrified, so that coils A and D are electrified.

FIG. 4 is a partial sectional view showing the internal components of the stepping motor of the embodiment of the invention. Specifically, FIG. 4 three-dimensionally shows the flows of coil currents iα and iβ when (2)→(1) and (5)→(6) of the terminals 10 shown in FIG. 3 are electrified, the polarities of the stator iron cores α and β having magnetic poles set by the coil currents iα and iβ, and the magnetic pole state of the permanent magnet 4.

Figure 5:
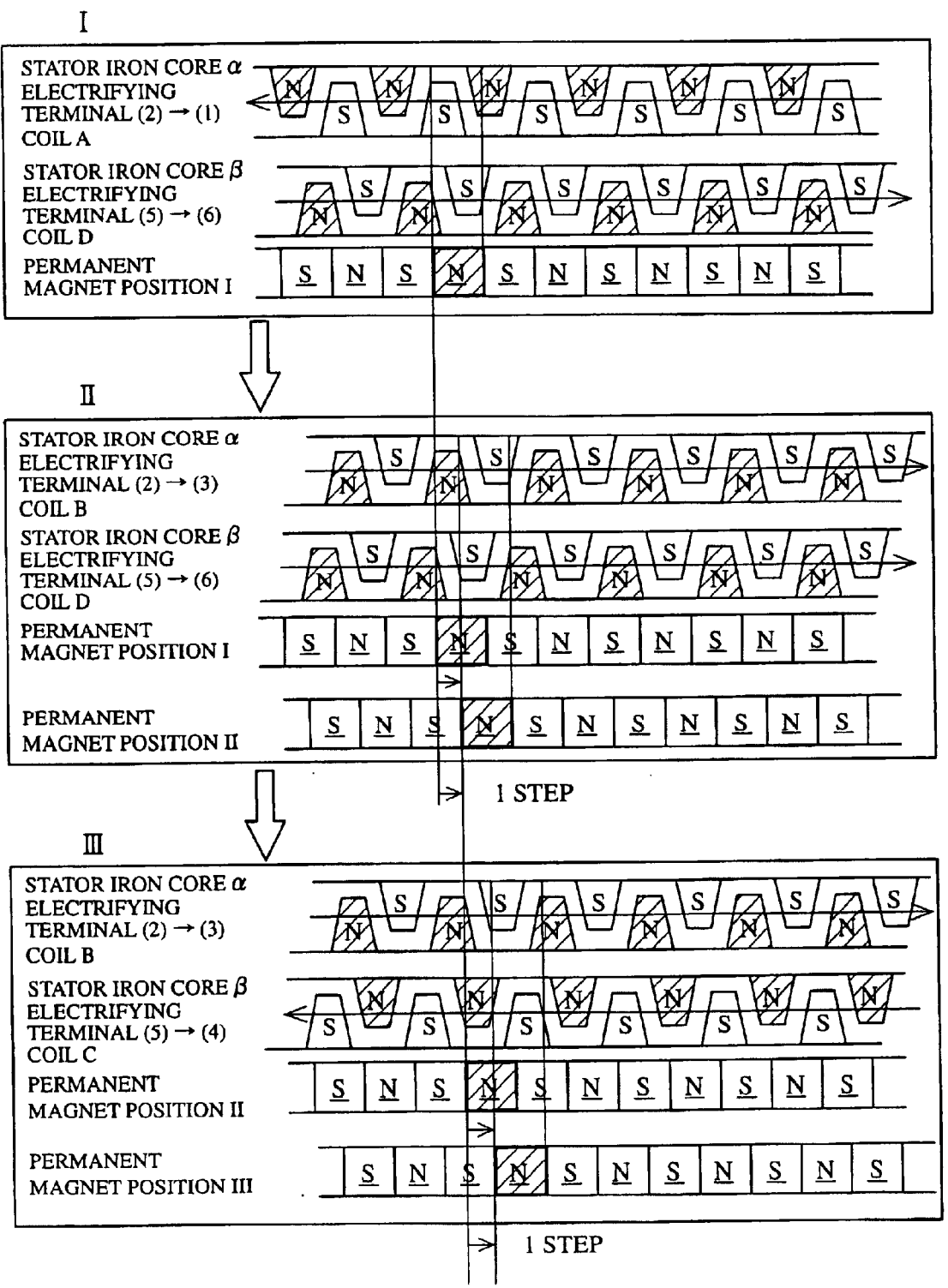
FIG. 5 is a plan development view showing a magnetic pole state of a stator iron core of the stepping motor of the embodiment.

FIG. 5 is a plan development view showing the magnetic pole state of the stator iron core of the stepping motor of the embodiment of the invention. FIG. 5 specifically shows the process of a change in the magnetic poles of the stator iron cores α and β having magnetic poles set based on the directions of the currents flowing to the coils A to D, and a change in the position of the permanent magnet 4 caused by the change in the magnetic poles of the stator iron cores α and β.

Figure 6A:
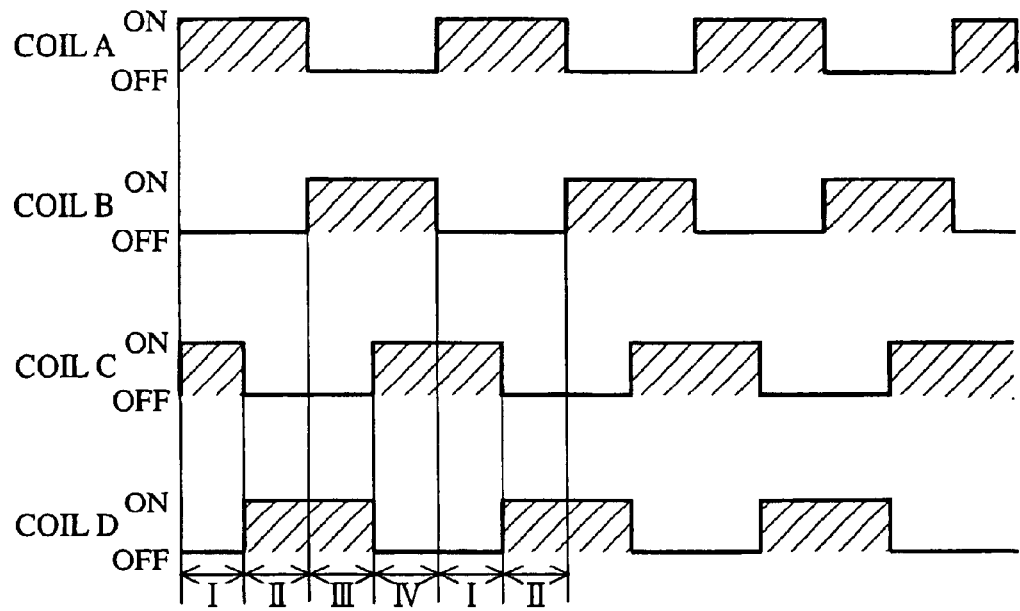
FIGS. 6A and 6B are sequential views, each showing an example of an electrification pattern of the stepping motor of the embodiment.
Figure 6B:
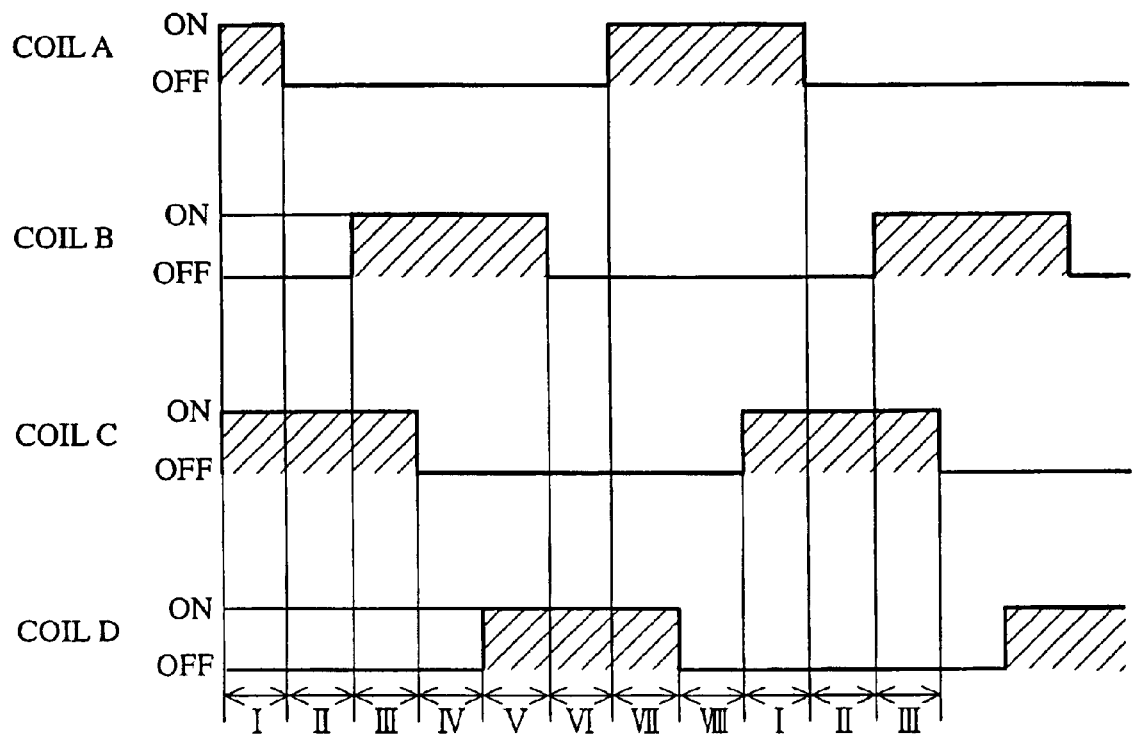

FIGS. 6A and 6B are sequential views, showing an example of an electrification pattern of the stepping motor of the embodiment of the invention. Specifically, FIG. 6A shows a 2-phase electrification system for normally electrifying two coils; and FIG. 6B a 1–2 phase electrification system, which may electrify only one coil.

Figure 7:
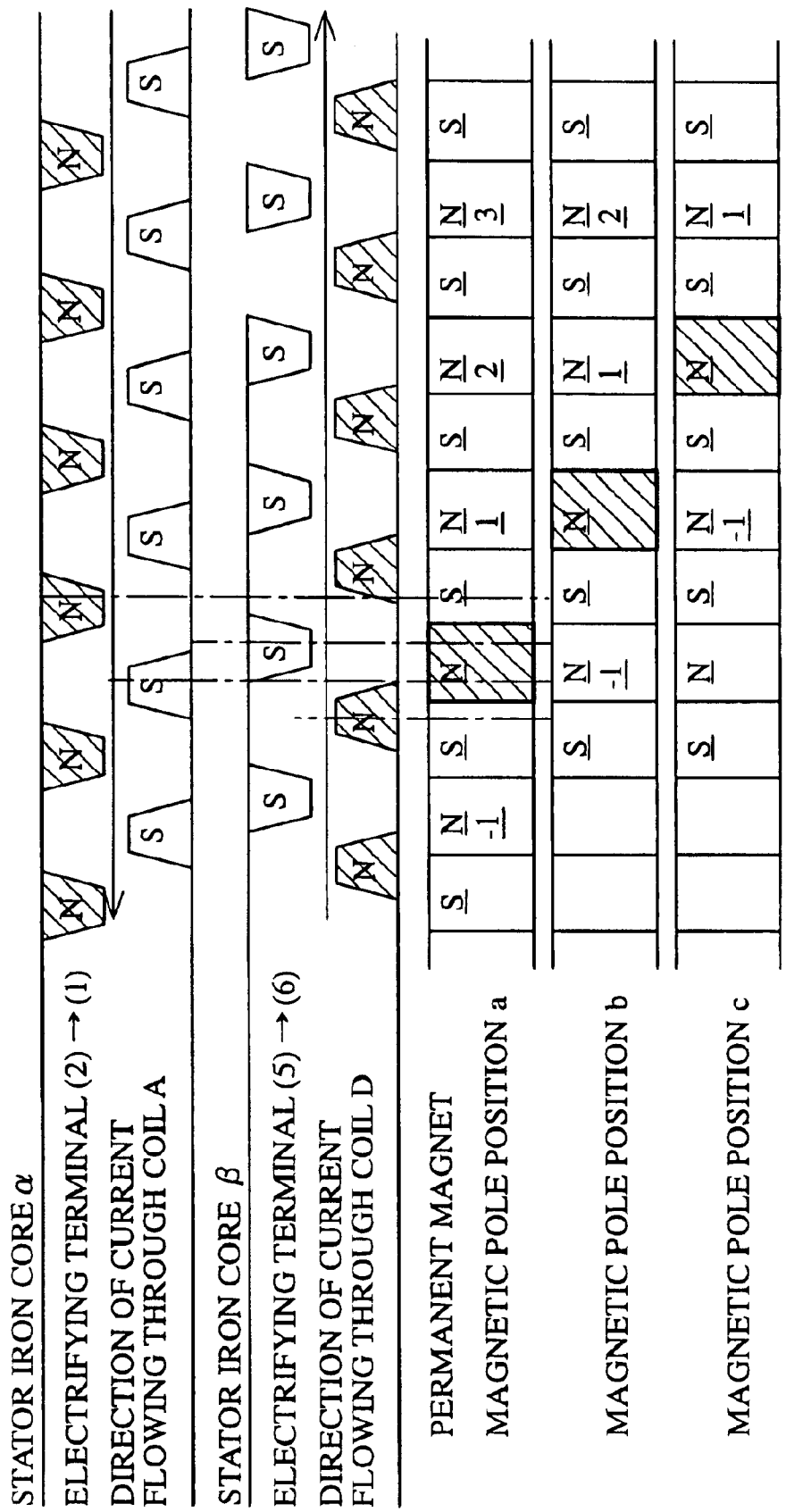
FIG. 7 is a plan development view showing a position of a permanent magnet of the stepping motor of the embodiment.

FIG. 7 is a plan development view showing the position of the permanent magnet of the stepping motor of the embodiment of the invention. FIG. 7 specifically shows the fact that there are a plurality of stable positions for the magnetic pole of the permanent magnet 4 even when the polarities of the stator iron cores α and β having magnetic poles set based on a current flowing through the coil are maintained constant.

Figure 8A:
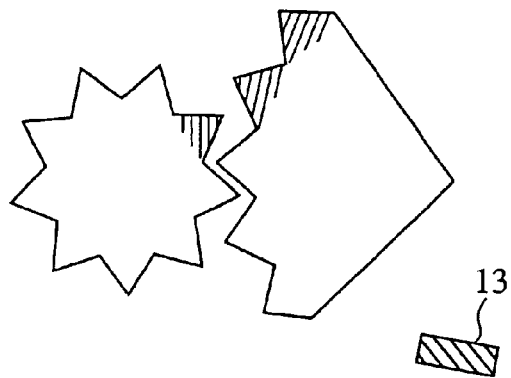
FIGS. 8A and 8B are explanatory views, illustrating a situation of assembling work for teeth respectively of a gear to be driven, and that of an output shaft gear of a conventional stepping motor.
Figure 8B:
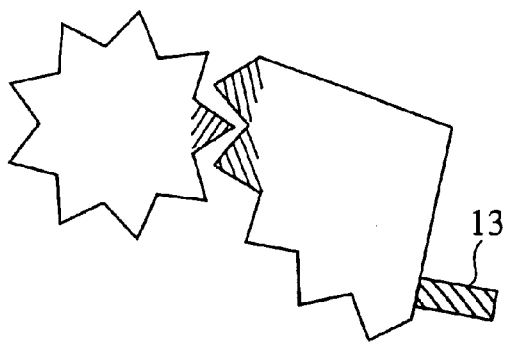

FIGS. 8A and 8B are explanatory views illustrating the situation of assembling work for the teeth respectively of the gear to be driven and that of the output shaft gear of a conventional stepping motor. Here, there is shown a case in which the number of magnetically stable points by one electrification pattern is 12, and the number of teeth of the output shaft gear is 9.

Figure 9:
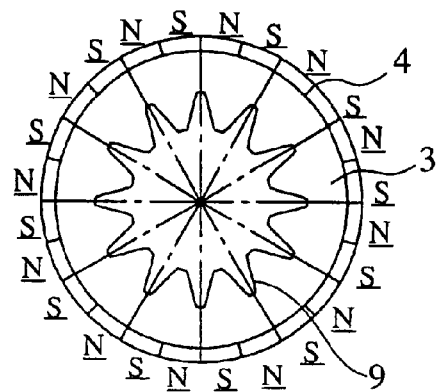
FIG. 9 is an explanatory view illustrating the relation between the position of a tooth of an output shaft gear, and the position of a magnetic pole of a permanent magnet of the stepping motor of the embodiment of the invention.

FIG. 9 is an explanatory view illustrating the relation between the position of the tooth of the output shaft gear and that of the magnetic pole of the permanent magnet of the stepping motor of the embodiment of the invention. Here, there is shown a case in which the number of magnetically stable points in the case shown, by one electrification pattern is 12, and the number of teeth for the output shaft gear is also 12.

Figure 10:
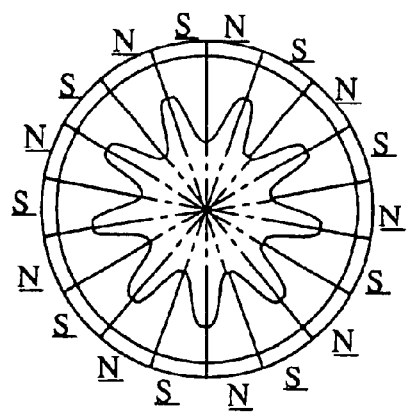
FIG. 10 is an explanatory view illustrating the relation between the position of a tooth of the output shaft gear, and the position of the tooth of a magnetic pole of the permanent magnet of the stepping motor of the embodiment.

FIG. 10 is an explanatory view illustrating the relation between the position of the tooth of the output shaft gear and that of the magnetic pole of the permanent magnet of the stepping motor of the embodiment of the invention. Here, there is shown a case in which the number of magnetically stable points by one electrification pattern is 9, and the number of teeth for the output shaft gear is also 9. Note that a code N indicates the N pole of the permanent magnet 4, and S the position of the S pole of the same.

Figure 11A:
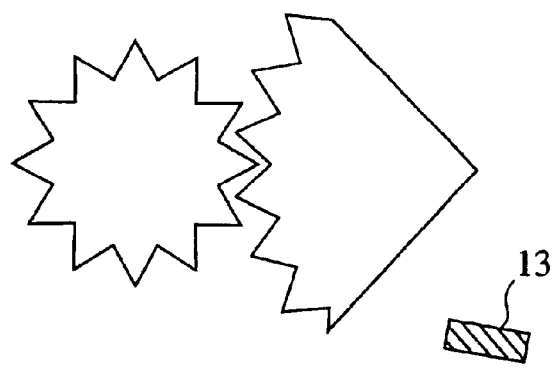
FIGS. 11A and 11B are explanatory views, illustrating the situation of assembling work for teeth respectively of the gear to be driven, and that of the output shaft gear of the stepping motor of the embodiment.
Figure 11B:
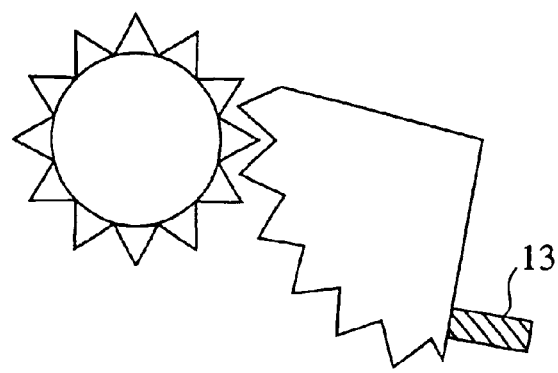

FIGS. 11A and 11B are explanatory views, illustrating the situation of assembling work for the teeth respectively of the gear to be driven, and that of the output shaft gear of the stepping motor of the embodiment of the invention. Here, there is shown a case in which the number of magnetically stable points by one electrification pattern is 12, and the number of teeth for the output shaft gear is also 12.

Figure 12:
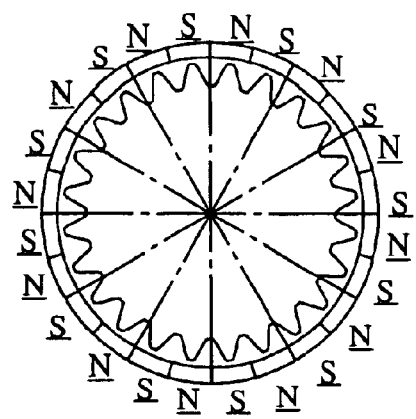
FIG. 12 is an explanatory view illustrating the relation between the position of the tooth of the gear to be driven, and the position of the magnetic pole of the permanent magnet of the stepping motor of the embodiment.

FIG. 12 is an explanatory view illustrating the relation between the position of the tooth of the output shaft gear and that of the magnetic pole of the permanent magnet of the stepping motor of the embodiment of the invention. Here, there is shown a case in which the number of magnetically stable points by one electrification pattern is 12, and the number of teeth for the output shaft is twice as large as 24, for example.

Figure 13A:
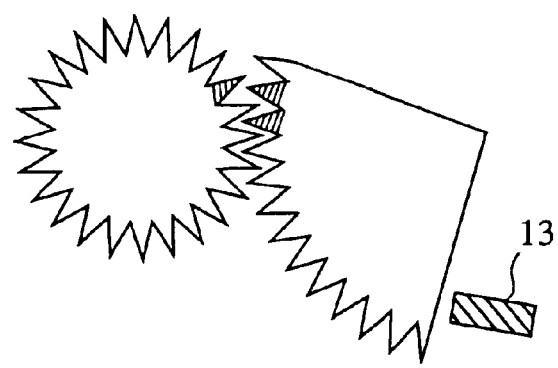
FIGS. 13A and 13B are explanatory views, illustrating the situation of assembling work for the teeth respectively of the gear to be driven, and that of the output shaft gear of the stepping motor of the embodiment.
Figure 13B:
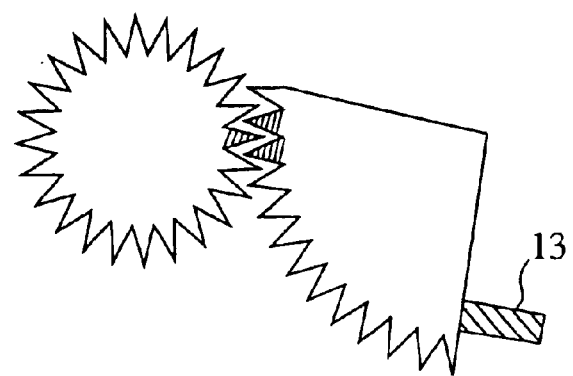

FIGS. 13A and 13B are explanatory views, illustrating the situation of assembling work for the teeth respectively of the gear to be driven, and that of the output shaft gear of the stepping motor of the embodiment of the invention. Here, there is shown a case in which the number of magnetically stable points by one electrification pattern is 12, and the number of teeth for the output shaft gear is twice as large as 24, for example.

Figure 14:
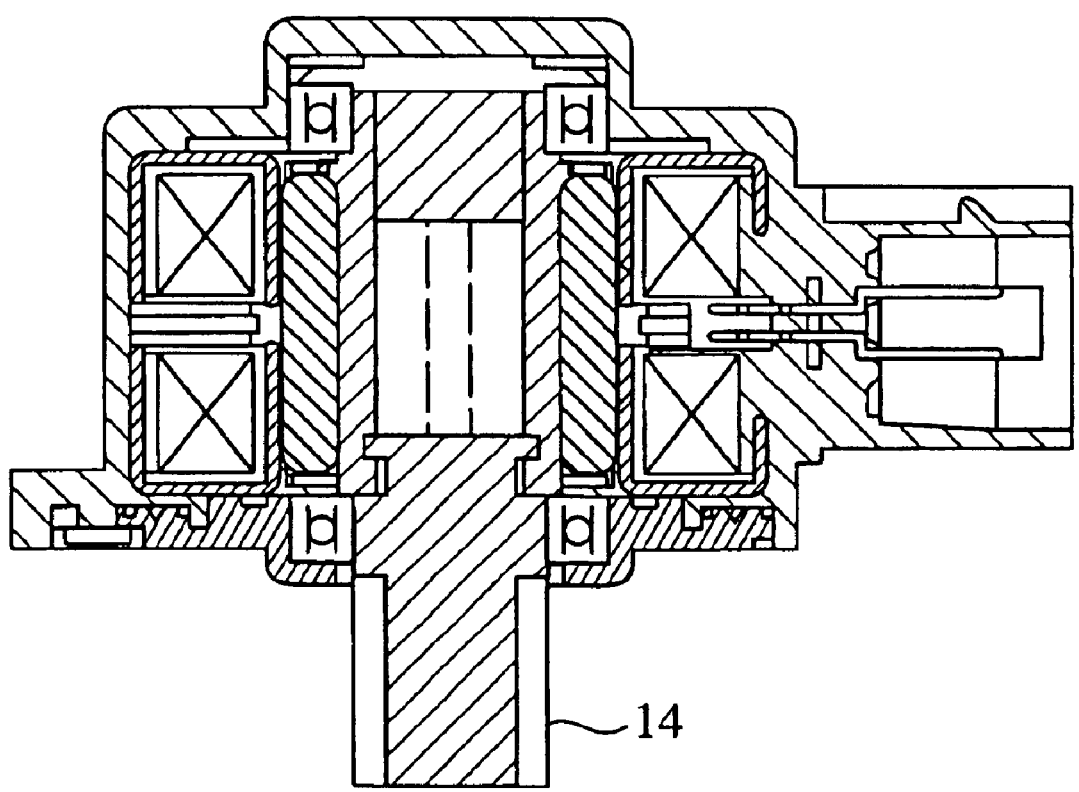
FIG. 14 is a sectional view schematically showing a structure of the stepping motor of the embodiment.

FIG. 14 is a sectional view schematically showing the structure of the stepping motor of the embodiment of the invention. In the drawing, a reference numeral 14 denotes an output shaft gear made of a metallic material, integrally provided in the output shaft 3 made of a resin material.

Next, the operation of the stepping motor will now be described.

First, description will be made about the structure of the stepping motor.

As shown in FIG. 1, this stepping motor comprises: four coils 1 capable of switching the direction of magnetism by electrification switching; and two pairs of stator iron cores 2 disposed to envelope the coils 1, and integrate magnetism generated by the coils 1 to form magnetic poles, which stator iron cores 2 being held integrally with the coils 1 by the housing 5. In the inner diameter side of the stator iron core 2, a permanent magnet 4 having magnetic poles divided and magnetized into 24 poles on the surface of a circumference is held by the output shaft 3 of the rotor so as to be rotated by the bearing 7. The boss 6 holds one end of the bearing 7, and it is fixed to the housing 5, constituting the outer portion of the stepping motor. In addition, the elastic body 8 is provided between the housing 5 and the bearing 7, in order to prevent the positional shifting of the rotor in an axial direction. Moreover, in the output shaft 3 of the rotor, the output shaft gear 9 is formed to transmit rotational torque to the driven gear 11, which is fixed to the member to be driven 12.

As shown in FIGS. 2A and 2B, in a portion to be driven by the stepping motor, the reference position stopper 13 is disposed to be abutted on the gear 11 to be driven. The gear to be driven 11, engaged with the output shaft gear 9 of the stepping motor, is rotated by the rotational torque of the stepping motor, and brought into contact with the reference position stopper 13, thereby to regulate the reference position. The reference position stopper 13 may be provided in such a manner as to be abutted to the member to be driven 12.

Next, description will be made about the operation of the stepping motor.

As shown in FIG. 3, the coils A and B and the coils C and D of the coils 1 are respectively connected to each other such that the direction of current can be reversed during electrification. As shown in FIG. 4, $\alpha$ and $\beta$ of the stator iron cores 2 are laid over the other so as to envelop the coils A and B, and the coils C and D of the coils 1. As shown in FIGS. 3 and 4, the stepping motor is operated in such a manner that it is first electrified, and a magnetic force is generated when a current flows to the coil 1, and due to this, the magnetic force is integrated by the stator iron core 2, so that the claw parts of the stator iron core 2 are set to N and S poles and, by attraction/repulsion with the N and S poles on the surface of the permanent magnet 4, rotational torque is generated in the permanent magnet 4. Then, moving to a next magnetically stable point, the rotor is rotated.

For example, in the case of the 2-phase electrification system for normally electrifying two coils 1, as shown in I of FIG. 5, when A and D of the coils 1 are electrified, the claw parts of $\alpha$ and $\beta$ of the stator iron cores 2 become N and S poles by currents flowing thereto. In this case, the N and S poles on the surface of the permanent magnet 4 are maintained in a magnetically stable state in the permanent magnet position I of I of FIG. 5, by attraction/repulsion with the magnetic poles of the claw parts of the stator iron core 2.

Then, when a need arises to move the member to be driven 12, as shown in II of FIG. 5, the electrification of the stator motor is switched from A to B of the coils 1, and the direction of current flowing in $\alpha$ of the stator iron core 2 is reversed, thereby to set the claw part of $\alpha$ of the stator iron core 2 is set to a magnetic pole opposite that of I of FIG. 5. Accordingly, the permanent magnet 4 held in the magnetically stable state in I of FIG. 5 becomes magnetically unstable because of the reversal of the magnetic pole of $\alpha$ of the stator iron core 2 as described above, and is consequently moved from the position of the permanent magnet position I in II of FIG. 5 to the position II, in which the permanent magnet 4 is magnetically stabilized.

Further, when a need arises to move the member to be driven 12, as shown in III of FIG. 5 similar to II of FIG. 5, electrification is switched from D to C of the coil 1, and the direction of current flowing in $\beta$ of the stator iron core 2 is reversed. Accordingly, the claw part of $\alpha$ of the stator iron core 2 is set to a magnetic pole opposite to that of II of FIG. 5, and the permanent magnet 4 is moved from the permanent magnet position II in III of FIG. 5 to the position III, in which the permanent magnet is magnetically stabilized.

As described above, by switching an electrification pattern for the coil 1 as shown in FIGS. 6A and 6B, the direction of current flowing through the coil 1 is reversed, and the magnetic pole of the claw part of the stator iron core 2 is switched, so that torque is generated in the permanent magnet 4 by attraction/repulsion of the magnetic pole of the permanent magnet 4. Due to this, the output shaft 3 of the rotor holding the permanent magnet 4 is rotated, by one step for each electrification switching.

The foregoing operation principle is employed also in the case of the 1–2 phase electrification system for electrifying only one coil shown in FIG. 6B, in which an angle of rotation per step is halved for the 2-phase electrification system shown in FIG. 6A. That is, a rotational principle is similar to that for the 2-phase electrification system, because there is only one difference in which a timing for non-magnetization is caused when the magnetic pole of the claw part of the stator iron core 2 is switched, but the stator iron core 2 of the electrified coil side has been magnetized.

In other words, the stepping motor has a characteristic that unless the direction of current flowing through the coil 1 is reversed, or electrification is changed from ON to OFF, or OFF to ON, the permanent magnet 4 is magnetically stable, and the output shaft 3 of the rotor holding the permanent magnet 4 holds its position without being rotated.

By making use of this characteristic, the stepping motor has been employed in various fields. However, a reference position for the portion to be driven by the stepping motor is usually regulated due to its use, and the electrification pattern of the stepping motor in the reference position is also regulated in most cases.

However, as shown in FIG. 7, for example if the electrification of A and D of the coils 1 is set as an electrification pattern for the stepping motor in the reference position, the claw parts respectively of α of the stator iron core 2 magnetized by current flowing through A of the coil 1, and α of the stator iron core 2 magnetized by current flowing through D of the coil 1 are magnetized and set to magnetic poles as shown in FIG. 7. Because of balance of attraction/repulsion with the magnetic pole of the permanent magnet 4, the permanent magnet 4 is stably held in a magnetic pole position a shown in FIG. 7. However, in magnetic pole positions b and c, the magnetic poles of the claw part of the stator iron core 2, and the permanent magnet 4 are similarly magnetically stable as in the case of the magnetic pole position a.

That is, even if an electrification pattern for the stepping motor in the reference position is regulated to one, there are a plurality of magnetically stable points by attraction/repulsion between the magnetic pole of the stator iron core 2 magnetized by the current flowing through the coil 1 and the magnetic pole of the permanent magnet 4. Thus, it is impossible to define at which of the plurality of magnetically stable points the position of the rotor holding the permanent magnet 4 and having the output shaft gear 9 formed in the output shaft 3 should be stabilized.

Thus, as described above in the section of the related art, in the conventional stepping motor, in order to assemble the stepping motor by engaging the tooth of the gear to be driven 11, attached to the member to be driven 12, with the tooth of the output shaft gear 9 of the rotor held in the magnetically stable state by the electrification pattern regulated for the stepping motor in the reference position, assembling work and devices described below were necessary.

Each of FIGS. 8A and 8B show assembling work in the conventional stepping motor, as an example case in which for example when by one electrification pattern, the number of magnetically stable points is 12, and the number of teeth for the output shaft gear is 9. When the number of magnetically stable points is 12, and the number of teeth for the output shaft gear is 9, the magnetically stable points are present at a pitch of 30°, and the teeth of the output shaft gear are present at 40°. Thus, the teeth of the output shaft gear are shifted by 10° with respect to the magnetically stable points. Therefore, among the 9 teeth of the output shaft gear, for three teeth for every 120°, the positions of the teeth of the output shaft gear coincide with the magnetically stable points. However, for the other 6 teeth of the output shaft gear, the positions of the teeth of the output shaft gear do not coincide with the magnetically stable points. Thus, as shown in FIG. 8A, even when the stepping motor is electrified by the regulated electrification pattern, it is not always the case that the tooth of the output shaft gear coincides with the reference position of the gear to be driven, to be engaged. Hence, it is necessary to carry out work for verifying the position of the tooth of the output shaft gear, attaching a mark or the like to the tooth of the output shaft gear normally engaged with the gear to be driven, electrifying the stepping motor again by the regulated electrification pattern to rotate the stepping motor, and as shown in FIG. 8B, engaging the tooth of the output shaft gear, coinciding with the magnetically stable point, with the tooth of the gear to be driven when the gear to be driven is fixed by the reference position stopper.

Accordingly, devices for holding the member to be driven by the reference position stopper, and electrifying the stepping motor must be provided.

As a result, the efficiency of assembling work was reduced because of the necessities of complex work and various devices.

However, since the number of magnetically stable points by one regulated electrification pattern can be calculated by an equation below, the number of teeth for the output shaft gear can be set equal to the number of magnetically stable points at a designing stage:

> (number of magnetically stable points per rotation by one electrification pattern)=(total number of claws of stator iron core)÷(2 poles, N and S, of stator iron core)÷(2 phases, upper and lower, of stator iron core)

However, the 2 poles, N and S, of the stator iron core are fixed values of 2.

For example, if the stepping motor of the embodiment is arranged to have 4 coils, and totally 48 claw parts of the stator iron core 2, then an equation below is established:

> 48÷2÷2=12

Thus, the number of magnetically stable points per rotation is 12 and, as shown in FIG. 9, by setting the number of teeth for the output shaft gear to 12, the numbers respectively of magnetically stable points and teeth for the output shaft gear can be set equal to each other.

In such a case, since there are two kinds of magnetic poles, N and S, it is necessary to preset the total number of magnetic poles for the permanent magnet 4 as follows:

> (total number of claw parts)÷(2 poles, N and S, of permanent magnet)=(½ of total number of claw parts of stator iron core)= 48÷2=24

Further, if the total number of claw parts for the stator iron core 2 of the stepping motor is 36, then the number of magnetic poles for the permanent magnet 4 is 18, and the number of magnetically stable points per rotation is obtained as follows:

> 36÷2÷2=9

As shown in FIG. 10, by setting the number of teeth for the output shaft gear 9 to 9, the numbers respectively of magnetically stable points, and teeth for the output shaft gear can be set equal to each other.

As described above, if the total number of claws for the stator iron core 2 of the stepping motor is defined, the number of magnetically stable points per rotation by one electrification pattern can be obtained by calculation. Thus, in the case of the stepping motor having 48 stator claws of the foregoing example, as shown in FIG. 9, by setting the number of teeth for the output shaft gear 9 equal to that, namely 12, of magnetically stable points per rotation by one electrification pattern, the position of the tooth for the output shaft gear 9 is the same even when the permanent magnet 4 is stably held at any one of the magnetically stable points. Even if the tooth of the output shaft gear is optionally engaged with that of the gear to be driven as shown in FIG. 11A, as shown in FIG. 11B, when the stepping motor is driven to the reference position stopper, and electrified by the regulated electrification pattern, the tooth for the output shaft gear is located in a prescribed position. Thus, the gear to be driven engaged with the output shaft gear is also located in a normal reference position.

In addition, in the stepping motor similar to that of the embodiment, the number of teeth for the output shaft gear 9 may be an integral multiple or 1/integer of the number of magnetically stable points by one electrification pattern. FIG. 12 shows a case where the number of magnetically stable points is 12, and the number of teeth for the output shaft gear 9 is twice as large as 24 for example.

Among the 24 teeth for the output shaft gear, 12 teeth appearing at every 30° of angle coincide in terms of positions with the magnetically stable points.

However, the other 12 teeth respectively sandwiched by the coincident 12 teeth of the output shaft gear are shifted by 15°, and thus they are not in coincidence with the magnetically stable points in terms of positions. Consequently, as shown in FIG. 13A, when the tooth of the gear to be driven is optionally engaged with that of the output shaft gear, incorrect positioning of the gear to be driven in the reference position may occur by a probability of ½.

In such a case, as shown in FIG. 13B, by aligning the gear to be driven with the reference position stopper, and electrifying the stepping motor in the reference position based on the regulated electrification pattern, thereby stabilizing the rotor magnetically, the tooth to be engaged with the output shaft gear is always held in the normal position. Thus, the tooth can be easily engaged with the gear to be driven, without any needs to verify the position of the tooth of the output shaft gear, to attach a mark to the tooth of the gear to be engaged, or to carry out other work, which were conventionally necessary, so that the assembling work of the stepping motor can be facilitated.

FIG. 14 shows an output shaft gear 14 made of a metallic material. In this case, it is possible to increase the strength of the output shaft gear, and realize miniaturization.

Furthermore, the stepping motor of the embodiment can be used for various kinds of purposes, as long as the stepping motor transmits a generated rotational force to the output shaft gear. Especially, the stepping motor can be used for an on-vehicle butterfly valve, a throttle valve, a swirl control valve, and so on.

As described above, according to the embodiment, by setting the number of teeth for the output shaft gear 9 equal to that of magnetically stable points per rotation of the rotor, even when the teeth respectively of the gear to be driven 11 and the output shaft gear 9 are optionally connected to each other, the teeth are engaged with each other in the normal position with regard to the reference position. Thus, unnecessary work in the assembling work can be eliminated, and various devices can be made unnecessary during the assembling work.

Further, in a state that the number of teeth for the output shaft gear 9 is made to a predetermined ratio, i.e., an integral multiple or 1/integer of the number magnetically stable points per rotation of the rotor, if electrification is carried out by the regulated electrification pattern, and the teeth respectively of the gear to be driven 11 and the output shaft gear 9 are connected to each other while the member to be driven 12 is held by the reference position stopper 13, the teeth are engaged with each other in the normal position with respect to the reference position. Therefore, it is possible to eliminate the work of verifying the position of the tooth of the output shaft gear when electrification is carried out by the regulated electrification pattern, and to increase the efficiency of assembling work.

Since the output shaft 3 of the rotor, and the output shaft gear 9 are integrally formed, it is possible to reduce the work of attaching the output shaft gear 9 to the output shaft 3 of the rotor, thereby to increase position accuracy for the rotor and the tooth of the output shaft gear 9.

Since the output shaft gear 9 is made of a resin material, it is possible to manufacture the output shaft gear 9 at low costs.

Moreover, since the output shaft gear 14 is made of a metallic material, it is possible to increase the strength of the output shaft gear 14, and to realize miniaturization.

The advantages of the present invention can be summarized as follows. That is, as described above, according to the present invention, in order to hold the member to be driven in the reference position when the coil is electrified by the regulated electrification pattern, the number of teeth for the output shaft gear is set to a predetermined ratio with respect to the number of magnetically stable points per rotation of the rotor. Thus, by connecting the teeth respectively of the gear to be driven of the driven member, and the output shaft gear of the rotor of the stepping motor to each other while the coil is electrified by the regulated electrification pattern, and the member to be driven is held in the reference position, the teeth are engaged with each other in the normal position with respect to the reference position. Accordingly, it is possible to eliminate the work of verifying the position of the tooth of the output shaft gear when electrification is carried out by the regulated electrification pattern, thereby to increase the efficiency of assembling work.

According to the invention, the number of teeth for the output shaft gear is set equal to that of magnetically stable points per rotation of the rotor. Thus, when the coil is electrified by the regulated electrification pattern, there are a plurality of magnetically stable holding positions of the rotor for holding the permanent magnet. However, even if electrification is carried out by the regulated electrification pattern after the teeth respectively of the gear to be driven of the driven member and of the output shaft gear of the rotor of the stepping motor are randomly connected to each other, the teeth are engaged with each other in the normal position with respect to the reference position. Accordingly, it is possible to eliminate unnecessary work, such as holding of the member to be driven in the reference position, in the assembling work. Moreover, it is possible to make unnecessary devices for holding the member to be driven in the reference position, electrifying the stepping motor, and so on.

According to the invention, the output shaft of the rotor, and the output shaft gear are integrally formed. Thus, it is possible to reduce the work of attaching the output shaft gear to the output shaft of the rotor, and to increase position accuracy for the rotor and the tooth of the output shaft gear.

In addition, according to the invention, since the output shaft gear is made of a resin material, it is possible to manufacture the output shaft gear at low costs.

Furthermore, according to the invention, since the output shaft gear is made of a metallic material, it is possible to increase the strength of the output shaft gear, and to realize miniaturization.

What is claimed is:

1. A stepping motor comprising:
    a plurality of coils for switching a direction of magnetism generated by switching electrification;
    a stator including a plurality of stator iron cores, for forming a magnetic pole by integrating magnetism generated by each of the coils;
    a rotor adapted to hold a permanent magnet, and rotated by attraction/repulsion between the permanent magnet and a magnetic pole of each of the stator iron cores;
    a housing provided to integrally cover the stator and the rotor; and
    an output shaft gear formed in an output shaft of the rotor, and connected to a gear to be driven, of a member to be driven,
    wherein the number of teeth for the output shaft gear is set to a predetermined ratio with respect to the number of magnetically stable points per rotation of the rotor, in order to hold said member to be driven in a reference position when the coil is electrified by a regulated electrification pattern.

2. The stepping motor according to claim 1, wherein the number of magnetically stable points per rotation by one electrification pattern is obtained by the following equation:

(number of magnetically stable points per rotation by one electrification pattern)=(total number of claws of stator iron core)+(2 poles, N and S, of stator iron core)+(2 phases, upper and lower, of stator iron core)

wherein, the 2 poles, N and S, of the stator iron core are fixed values of 2.

3. The stepping motor according to claim 1, wherein the number of teeth for the output shaft gear is set equal to the number of magnetically stable points per rotation of the rotor.

4. The stepping motor according to claim 1, wherein the output shaft of the rotor and the output shaft gear are formed to be integral.

5. The stepping motor according to claim 1, wherein the output shaft gear is made of a resin material.

6. The stepping motor according to claim 1, wherein the output shaft gear is made of a metallic material.

* * * * *